United States Patent
Asplund

(10) Patent No.: US 10,052,959 B2
(45) Date of Patent: Aug. 21, 2018

(54) WEATHERPROOF TRACK AND CONTACT FOR ELECTRICAL FEEDING OF ROAD VEHICLES

(71) Applicant: Elways AB, Solna (SE)

(72) Inventor: Gunnar Asplund, Solna (SE)

(73) Assignee: ELWAYS AB, Solna (SE)

( * ) Notice: Subject to any disclaimer, the term of this patent is extended or adjusted under 35 U.S.C. 154(b) by 245 days.

(21) Appl. No.: 14/786,004

(22) PCT Filed: May 7, 2014

(86) PCT No.: PCT/SE2014/050562
§ 371 (c)(1),
(2) Date: Oct. 21, 2015

(87) PCT Pub. No.: WO2014/182234
PCT Pub. Date: Nov. 13, 2014

(65) Prior Publication Data
US 2016/0129790 A1     May 12, 2016

(30) Foreign Application Priority Data

May 7, 2013     (SE) ..................................... 1350558

(51) Int. Cl.
*B60L 5/38*     (2006.01)
*B60L 5/40*     (2006.01)
(Continued)

(52) U.S. Cl.
CPC ................. *B60L 5/38* (2013.01); *B60L 5/40* (2013.01); *B60M 1/34* (2013.01); *E01H 8/10* (2013.01)

(58) Field of Classification Search
CPC ...... B60L 5/00; B60L 5/04; B60L 5/08; B60L 5/36; B60L 5/38; B60L 5/39
See application file for complete search history.

(56) References Cited

U.S. PATENT DOCUMENTS

2013/0025991 A1     1/2013  Asplund

FOREIGN PATENT DOCUMENTS

| CN | 102834282 A |   | 12/2012 |   |
|----|-------------|---|---------|---|
| EP | 151982 | * | 1/1985 | ............... B62D 1/26 |

(Continued)

OTHER PUBLICATIONS

Office Action issued in the corresponding Chinese patent application No. 201480025717.X, Aug. 1, 2016, 8 pages.
(Continued)

*Primary Examiner* — Robert J McCarry, Jr.
(74) *Attorney, Agent, or Firm* — Raymond R. Ferrera; Adams and Reese LLP

(57) ABSTRACT

A contact device (1) directly or indirectly connectable to a vehicle and adapted to co-act mechanically and electrically with a track (2) comprising an electric conductor (7) put under voltage and located in a road section (6) on which the vehicle is travelling, in order to supply electric voltage to at least one electric motor which propels the vehicle, wherein the contact device (1) is displaceable upwards, downwards and laterally and comprises at least one current collector and at least one cleansing device (4). The current collector (3) comprises a sliding contact (8) configured to be brought into mechanical and electrical contact with at least a vertical side wall portion of the track.

13 Claims, 4 Drawing Sheets

(51) Int. Cl.
*B60M 1/34* (2006.01)
*E01H 8/10* (2006.01)

(56) References Cited

FOREIGN PATENT DOCUMENTS

| | | |
|---|---|---|
| EP | 0151982 A2 | 8/1985 |
| JP | 10151975 A | 6/1998 |
| WO | 9410020 A1 | 5/1994 |
| WO | 2011/123048 A1 | 10/2011 |
| WO | 2012134383 A1 | 10/2012 |

OTHER PUBLICATIONS

Office Action issued in the corresponding European Patent Application No. 14731404.1, Jul. 19, 2017, 5 pages.

\* cited by examiner

WEATHERPROOF TRACK AND CONTACT FOR ELECTRICAL FEEDING OF ROAD VEHICLES

The present invention relates to a contact device adapted to be connected to a vehicle in order to supply electric voltage to at least one electric motor which propels the vehicle. In a second aspect, the present invention relates to a vehicle comprising such a contact device.

TECHNICAL BACKGROUND OF THE INVENTION

Concerns about the environmental impact of combustion of fossil fuels have led to an increased interest in electric vehicles, which have several potential benefits compared to vehicles with conventional internal combustion engines, including: a significant reduction of urban air pollution, as they do not emit harmful tailpipe pollutants from the on-board source of power at the point of operation; reduced greenhouse gas emissions from the on-board source of power, depending on the fuel and technology used for electricity generation and/or charging the batteries and reduced dependency on fossil fuels with increasingly variable supply and fluctuating prices.

However, there are factors which discourage consumers from making the switch to electric vehicles. As of 2012, electric vehicles are significantly more expensive than conventional internal combustion engine vehicles and hybrid electric vehicles due to the additional cost of their lithium-ion battery pack. Another hurdle to overcome is the limited range of existing electric vehicles due to limitations in battery capacity.

WO 2010/140964 proposes one solution to the latter problem by feeding electric vehicles while driving. It discloses a system for electric propulsion of a vehicle along a road comprising electric conductors in the shape of conducting rails that may be put under voltage and located in longitudinal tracks or channels in the road. The vehicle is equipped with a current collector which during contact with the conducting rail allows for transfer of electric current between the conducting rail and the vehicle.

The stretch of road carrying the conductor conducting rails is divided into electrically separated road sections oriented in series, whereby the conducting rails are only put under voltage when a vehicle with its current collector passes the relevant road section.

In order for the current collector to make contact with the conducting rails it is mounted on suitable contact device acting as an extension between the vehicle and the conducting rails. One example of a contact device is given in WO 2011/123047, which is incorporated herein by reference. The contact device is adapted to co-act mechanically and electrically with an electric conductor put under voltage and located in a road section on which the vehicle is travelling, in order to supply electric voltage to the at least one electric motor which thereby propels the vehicle.

One drawback with the contact device proposed by the prior art is that the current collector is formed of a main portion made of electrically insulating material and a contact surface made of electrically conductive material protruding from the lower surface of the main portion. As such, the prior art proposes that the current collector makes mechanical and electrical contact with the bottom part of the track. However, since the conducting rail or track is located in the road it will be exposed to local weather conditions and tends to become filled with water during rain or covered in ice and snow during winter. Furthermore, all kinds of obstacles such as dirt, sand, stones or other debris may accumulate in the track. Although the main portion will act as a cleansing device to clear the conducting rail from debris, snow and/or ice, the electrical contact surface being located underneath the main portion may lead to poor and unreliable electrical contact, since the bottom part of the track may still be covered by debris, snow and/or ice even after clearing.

Therefore, there is a need to develop weatherproof contact devices with improved electrical contact.

SUMMARY OF THE INVENTION

The purpose of the present invention is to provide weatherproof contact devices with improved electrical contact.

This is achieved by a contact device according to claim 1.

According to the present invention, there is provided a contact device directly or indirectly connectable to a vehicle. The connection mechanism may comprise a longitudinal arm having a first end section attached in a rotatable manner to a part of the vehicle facing the road section and a second end section adapted to carry the contact device. Such a mechanism is described in WO 2011/123048, which is incorporated herein by reference. The mechanism is adapted to sense the presence of an electrified road section and will only then bring the contact means into mechanical and electric contact with the electric conductors, as described in WO 2011/123052, which is also incorporated herein by reference. Alternatively, the arm may be connected to an add-on motor assembly which in turn is connected to the vehicle, as described in international application PCT/SE2013/050245, incorporated herein by reference.

The vehicle may be any motor or road vehicle, i.e. suitable for road transportation, including, but not limited to, cars, buses, trucks, lorries and motorcycles. The contact device is adapted to co-act mechanically and electrically with a track comprising an electric conductor put under voltage and located in a road section on which the vehicle is travelling, in order to supply electric voltage to at least one electric motor which propels the vehicle, either supplementing or replacing the propulsion provided by the existing vehicle engine as the vehicle travels on a an electrified road section, e.g. by the system of WO 2010/140964, which is incorporated herein by reference. Further, the contact device is displaceable upwards, downwards and laterally and comprises at least one current collector and at least one cleansing device. The current collector comprises a sliding contact configured to be brought into mechanical and electrical contact with at least a vertical side wall portion of the track.

As dirt and water under the influence of gravity tend to accumulate in the lowest point of the track and thereby have a negative impact on the contact impedance, it is not favourable to have the electrical contact in the bottom of the track. Instead, the present invention proposes to move the point of contact to a vertical side wall portion of the track. Since dirt and water will not stay for a long time on the vertical side wall of the track, this part is the ideal location for a sliding contact.

Hence, the present invention solves the above problem by providing a point of mechanical and electrical contact between the current collector and the track located on a vertical side wall portion of the track. This significantly improves the electrical contact since the risk that the current collector makes electrical contact with an area of the track which is either covered by water, which may freeze to ice, snow or other debris such as dirt, sand or stones, is greatly reduced.

In a preferred embodiment, the contact device is configured to press the current collector against at least one vertical side wall of the track. This will further improve the electrical contact.

In an alternative embodiment, a bottom part of the current collector is disposed at a higher level than a bottom part of the cleansing device such that when the cleansing device rests against the bottom of the track the current collector remains separated from the bottom of the track. This feature further minimises the risk of the current collector coming into contact with dirt and water.

In a further preferred embodiment, the cleansing device comprises a front portion inclined at an acute angle with respect to the bottom part of the cleansing device. In the context of the present application, the term 'acute angle' should be interpreted as an angle smaller than 90°. The front portion is inclined in the backward direction so as to throw any obstacles such as dirt, stones, sand, water, ice, snow or other debris out of the track when the cleansing device is brought forward along the bottom of the track.

In an advantageous embodiment, the cleansing device comprises elastic material near its front portion and wherein the width of the cleansing device including the elastic material is substantially the same as the width of the track. Preferably, the cleansing device comprises elastic material on both sides to create a seal between the cleansing device and the vertical side walls of the track. By effectively sealing the gap between the cleansing device and the vertical side walls of the track, any fluid present in the track will be pushed out of the track, thus eliminating backflow of dirt, water and snow into the track. Also the air with possible content of sand and dust will be efficiently forced out of the track. Hence, a very efficient cleansing of the track is obtained which improves the conditions for achieving good and reliable electrical contact.

In a preferred embodiment, the contact device comprises a pair of current collectors and cleansing devices arranged side by side at a predetermined distance from each other and adapted to run in separate parallel tracks in the road section. Alternatively or in addition, the contact device comprises a pair of current collectors and cleansing device arranged end to end at a predetermined distance from each other and adapted to run in the same track in the road section. This allows for a more stable construction with improved supply of energy from the track.

In an alternative embodiment, the cleansing device further comprises a plurality of openings and a conduit in fluid communication with the plurality of openings, and wherein the cleansing device is adapted to be connected to a source of high pressure fluid to expel high pressure fluid through the plurality of openings. By expelling high pressure fluid through the openings to force water and dirt out of the track, it may be cleaned even more efficiently, thereby decreasing wear and tear of the sliding contacts/current collectors and the cleansing device.

In a further preferred embodiment, the plurality of openings is arranged on or near the front portion of the cleansing device. Preferably, at least part of the plurality of openings is arranged on or near a rear portion of the cleansing device. The placement of the openings ensures clearing of the track before passing of the cleansing device and/or the current collector.

In an advantageous embodiment, the plurality of openings is arranged at an angle with respect to the longitudinal extension of the cleansing device, said angle being in the range 0-180°. This way, the high pressure fluid may be directed in the forward, sidewise or backward directions or any angle there between, to optimise the cleansing effect of the fluid jet from the plurality of openings.

In an alternative embodiment, the high pressure fluid comprises compressed air or water at high pressure. Preferably, there is provided means for sucking and filtering water from the track to be used by the source of high pressure water.

In a second aspect of the present invention, there is provided a vehicle comprising at least one contact device according to any of the preceding embodiments.

DETAILED DESCRIPTION OF THE INVENTION

Preferred embodiments of a contact device according to the present invention will now be described with reference to the attached drawings. The invention should not be considered to be limited to the embodiments shown in the attached drawings, but may be varied within the scope of the claims.

Figure 1:
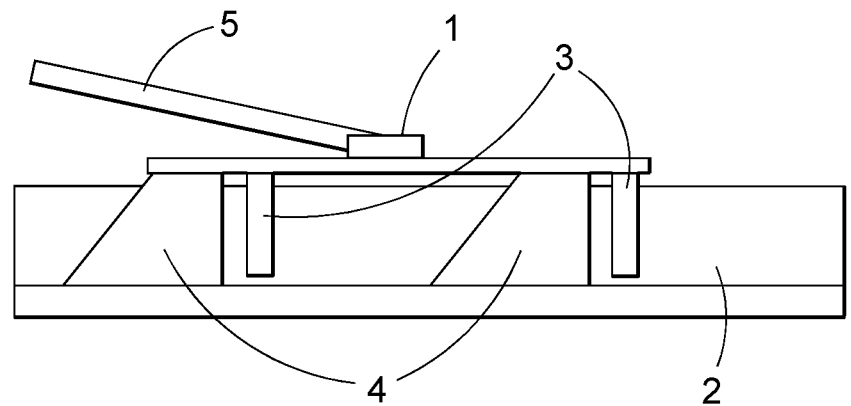
FIG. 1 illustrates a side view of a contact device according to the present invention.

FIG. 1 shows a schematic illustration of a contact device 1 according to the present invention. The contact device 1 is connected to a vehicle (not shown) by means of a mechanism comprising a longitudinal arm 5 which may displace the contact device 1 upwards, downwards and laterally. Further, the contact device 1 comprises a current collector and a cleansing device 4. The current collector and cleansing device 4 are each separately connected to the contact device. As shown, the current collector is mounted rearward of the cleansing device 4 such that the current collector is shielded from being hit by any obstacles.

Here, the contact device 1 is shown in a downwards displaced position where the cleansing device 4 rests against the bottom of an elongate track 2 comprising an electric conductor 7 and located in a road section 6 on which the vehicle is travelling. The current collector 3 of the contact device 1 is implemented as a sliding contact 8 and is brought into mechanical and electrical contact with the track 2 in order to supply electric voltage to at least one electric motor which propels the vehicle.

As is shown in FIG. 1, the bottom part of the current collector 3 is arranged at a higher level than the bottom part of the cleansing device 4. That way, the current collector 3 remains separated a distance from the bottom of the track 2 when the cleansing device 4 rests against the bottom of the track 2, to ensure that the current collector only makes contact with the vertical side wall portions of the track 2.

FIG. 1 illustrates a contact device 1 comprising two current collectors 3 and two cleansing devices 4 arranged end to end and thus adapted to run in the same track 2. As an alternative, a plurality of current collectors 3 and cleansing devices 4 may be foreseen.

Figure 2:
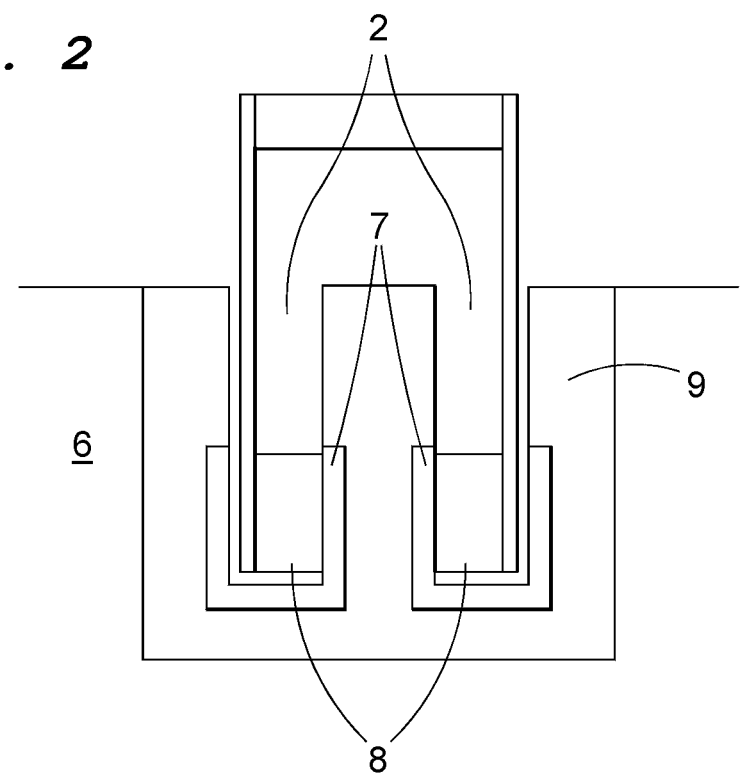
FIG. 2 illustrates a cross-sectional view of a first embodiment of a contact device according to the present invention.

Because dirt and water, which may freeze to ice, tends to gather at the lowest point of the track 2, i.e. along the bottom, this is not a favourable location for the point of electrical contact between the current collector 3 and the track 2. FIG. 2 shows a cross-sectional view of the contact device 1 located in a pair of parallel tracks 2 in the road section 6. The tracks 2 comprise electric conductors or rails 7 which are encapsulated in electrically insulating material in the shape of the capital letter E. It may be seen that the contact device 1 comprises two sliding contacts 8 arranged side by side at a predetermined distance from each other. The contact device 1 is configured to press the sliding contacts 8 against the inner side walls of the track 2 to ensure good electrical contact with the electric rails 7. This may be achieved by means of a biasing member, such as a spring, or simply as a result of the predetermined distance between the sliding contacts 8.

Figure 3:
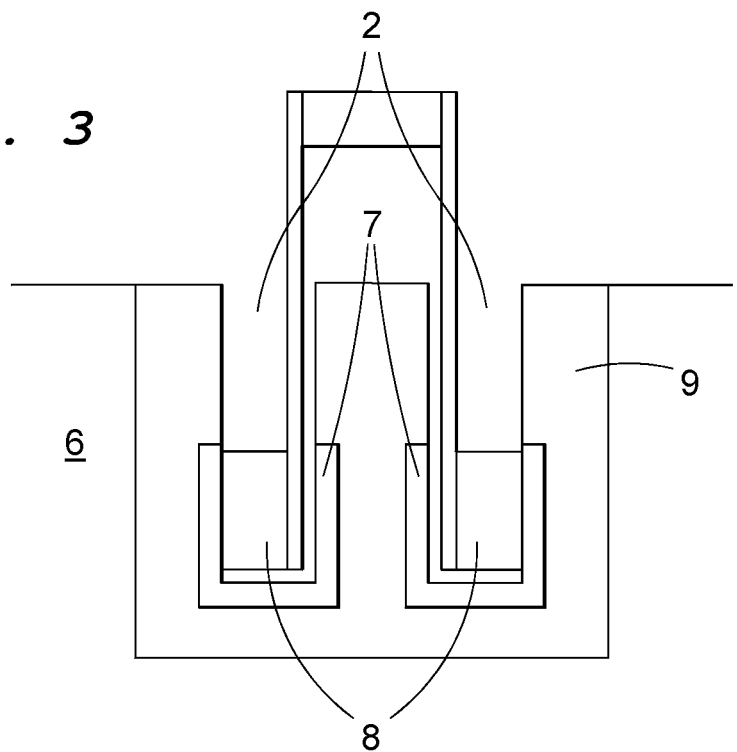
FIG. 3 illustrates a cross-sectional view of a second embodiment of a contact device according to the present invention.

In FIG. 3, there is shown an alternative construction in which the sliding contacts 8 are pressed against the outer side walls of the track 2. Since dirt and water will slide down from the vertical side walls towards the bottom of the track 2, this is an ideal location for the sliding contacts 8.

As the vehicle including moves forward (to the left in FIG. 1) the contact device 1 slides along the track 2. The front portion 11 of the cleansing device 4 is inclined at an acute angle with respect to the bottom part of the cleansing device 4. By acute angle is meant any angle smaller than a right angle, i.e. in the range 0° to 90°. When the contact device 1 encounters obstacles in the track 2, e.g. dirt, rocks, pebbles, water, ice and/or snow, the inclined front portion 11 will throw the obstacle out of the track 2 as a result of the velocity of the contact device 1.

However, it has been found that a substantial part of the dirt and water in the track 2 will remain in the track 2, even after passing of the cleansing device 4. This is due to the gap that exists between the side walls of the track 2 and the cleansing device 4 which allows air to pass through and thereby transport the dirt and water back into the track 2 after the cleansing device 4 has passed.

Figure 4:
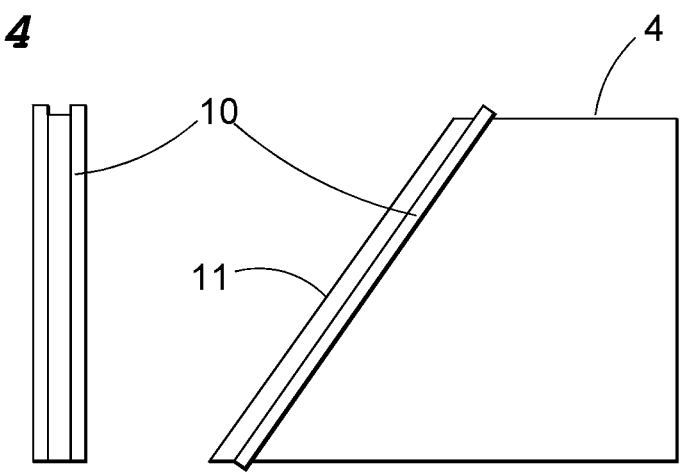
FIG. 4 illustrates a front and side view of a cleansing device of a contact device according to the present invention.

To solve this problem, it is proposed to provide elastic material 10 on or near the front portion 11 of the cleansing device 4 to form a seal between the cleansing device 4 and the vertical side walls of the track 2, as illustrated in FIG. 4. Preferably, the elastic material 10 is provided on both sides of the cleansing device 4 facing the vertical side walls of the track 2. The thickness and amount of elastic material 10 is chosen such that the combined width of the elastic material 10 and the cleansing device 4 is substantially the same or greater than the width of the track 2. Thus, a substantially fluid tight seal is achieved which results in efficient cleansing of the track 2 and minimises backflow of dirt and water or air containing sand and/or dust.

Even with the sealing effect of the elastic material 10 as described above, it can still be difficult to remove all particles and fluid such as fine sand and water from the track 2. The low amount of remaining particles and/or fluid might not be enough to prevent sufficient mechanical and electrical contact between the current collectors 3 and the electric rails 7, but could still cause considerable wear on the contact device 1 including the cleansing device 4 and the sliding contacts 8.

Figure 5:
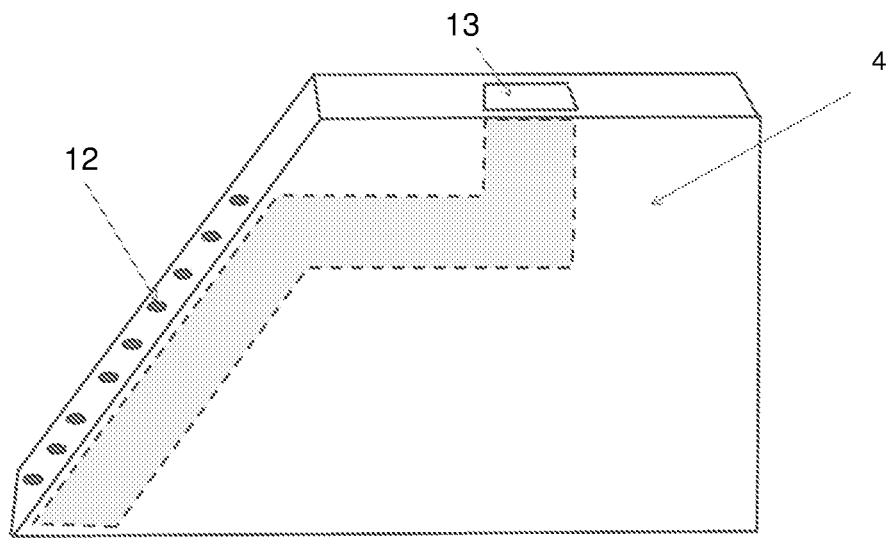
FIG. 5 illustrates a side view of a cleansing device according to an embodiment of the present invention.
Figure 6:
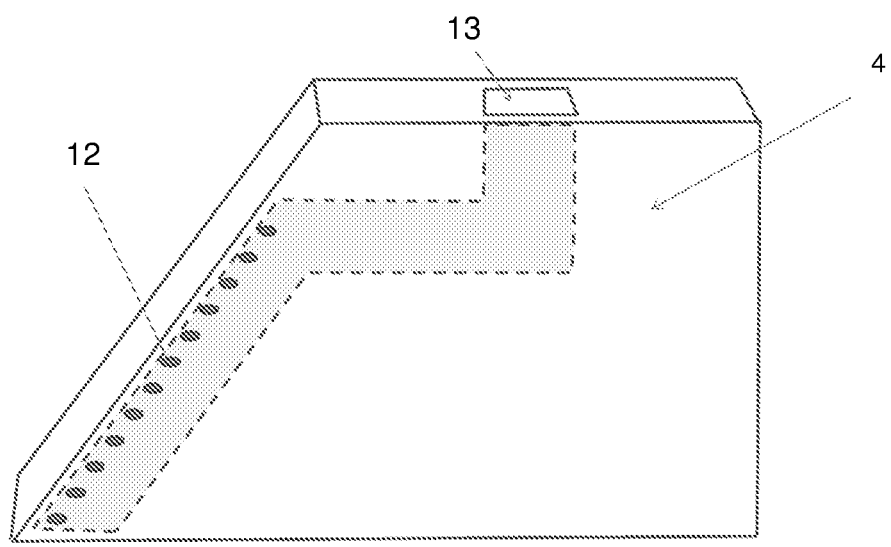
FIG. 6 illustrates a side view of a cleansing device according to an embodiment of the present invention.
Figure 7:
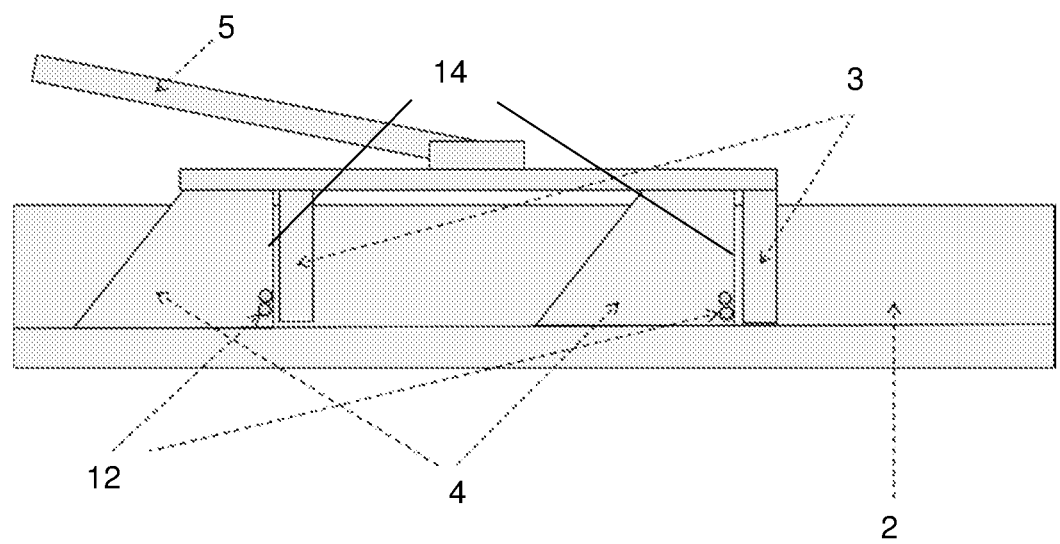
FIG. 7 illustrates a side view of a contact device according to an embodiment of the present invention.

Therefore, it is proposed to provide additional cleansing means in the form of high pressure fluid, such as compressed air or water at high pressure. As shown in FIGS. 5 and 6, the cleansing device 4 has an internal conduit or fluid channel 13 which is in fluid communication with a plurality of openings or nozzles 12. The cleansing device 4 is further adapted to be connected to a source of water or compressed air such that high pressure fluid is directed through the conduit 13 to the nozzles 12 and into the track 2. The nozzles 12 may be arranged on the front portion 11 of the cleansing device 4 as in FIG. 5, or on a side portion near the front portion 11 as in FIG. 6. Alternatively or in addition, nozzles 12 may be arranged near the rear portion 14 of the cleansing device as shown in FIG. 7. The nozzles 12 may be directed in the forward, sidewise or backward direction with respect to the cleansing device, or any angle there between to optimise the flow of the fluid jet exiting the nozzles 12. In other words, the nozzles 12 may be arranged at any angle with respect to the longitudinal extension of the cleansing device 4, which in turn runs substantially parallel to the track 2.

The source of compressed air may deliver compressed air at a pressure ranging from about 1 kPa up to about 500 kPa depending on the size of the nozzles 12 and the desired air flow rate, typically 1-100 liters per second. Typically, the air jet should have a velocity of around 100-500 m/s to blow away sand and dirt as well as water containing sand and dirt particles.

As an alternative also covered by the present invention, high pressure water similar to the principle of pressure washers could be used for cleansing. This is especially advantageous during rain when compressed air may not be sufficiently powerful to remove dirt and water in front of the contact. The water could be supplied from a tank in the vehicle or alternatively be sucked from the track by a suction device and filtered before being used by a high pressure unit comprising a pump. In the case of high pressure water, the pressure built up by means of the pump in connection with the tank is in the range from about 100 kPa up to about 10 MPa. The amount of water used is much lower than compressed air, typically around 1-10 liters per minute.

The invention claimed is:

1. Contact device connectable to a vehicle and adapted to co-act mechanically and electrically with a track comprising an electric conductor put under voltage and located in a road section on which the vehicle is travelling, in order to supply electric voltage to at least one electric motor which propels the vehicle, wherein the contact device is displaceable upwards, downwards and laterally and comprises at least one current collector and at least one cleansing device, the current collector comprises a sliding contact configured to be brought into mechanical and electrical contact with at least a vertical side wall of the track, wherein the cleansing device comprises a front portion inclined at an acute angle with respect to the bottom part of the cleansing device, and wherein elastic material is provided on opposite sides of the front portion of the cleansing device facing the vertical side walls of the track, and wherein the width of the cleansing device including the elastic material is substantially the same as or larger than the width of the track such that a substantially fluid tight seal is formed between the cleansing device and the vertical side wall of the track.

2. Contact device according to claim 1, further configured to press the current collector against at least one vertical side wall of the track.

3. Contact device according to claim 1, wherein a bottom part of the current collector is disposed at a higher level than a bottom part of the cleansing device such that when the cleansing device rests against the bottom of the track the current collector remains separated from the bottom of the track.

4. Contact device according to claim 1, wherein the cleansing device comprises elastic material near its front portion.

5. Contact device according to claim 1, comprising a pair of current collectors and cleansing devices arranged side by side at a predetermined distance from each other and adapted to run in separate parallel tracks in the road section.

6. Contact device according to claim 1, comprising a plurality of current collectors and cleansing devices arranged end to end at a predetermined distance from each other and adapted to run in the same track in the road section.

7. Contact device according to claim 1, wherein the cleansing device further comprises a plurality of openings and a conduit in fluid communication with the plurality of openings, and wherein the cleansing device is adapted to be connected to a source of high pressure fluid to expel high pressure fluid through the plurality of openings.

8. Contact device according to claim 7, wherein the plurality of openings are arranged on or near the front portion of the cleansing device.

9. Contact device according to claim 7, wherein at least part of the plurality of openings are arranged on or near a rear portion of the cleansing device.

10. Contact device according to claim 7, wherein the plurality of openings are arranged at an angle with respect to the longitudinal extension of the cleansing device, said angle being in the range 0-180°.

11. Contact device according to claim 7, wherein the high pressure fluid comprises compressed air or water at high pressure.

12. Contact device according to claim 7, further comprising means for sucking and filtering water from the track to be used by the source of high pressure fluid.

13. Vehicle comprising at least one contact device according to claim 1.

* * * * *